(12) United States Patent
Kuboshima et al.

(10) Patent No.: US 6,964,426 B2
(45) Date of Patent: Nov. 15, 2005

(54) SIDE STAND DEVICE FOR MOTORBIKE

(75) Inventors: Kenichiro Kuboshima, Wako (JP); Hideaki Yamazumi, Wako (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/221,946

(22) PCT Filed: Nov. 20, 2001

(86) PCT No.: PCT/JP01/10126

§ 371 (c)(1),
(2), (4) Date: Nov. 18, 2002

(87) PCT Pub. No.: WO02/057126

PCT Pub. Date: Jul. 25, 2002

(65) Prior Publication Data

US 2003/0111823 A1 Jun. 19, 2003

(30) Foreign Application Priority Data

Nov. 20, 2001 (JP) .................... 2000-012476

(51) Int. Cl.⁷ ................................ B62H 1/02
(52) U.S. Cl. .................... 280/301; 280/293
(58) Field of Search .............. 280/293, 298, 280/299, 300, 301, 302, 303; 74/527

(56) References Cited

U.S. PATENT DOCUMENTS

| 518,698 | A | * | 4/1894 | Pipes | 280/301 |
| 530,726 | A | * | 12/1894 | Scott et al. | 280/301 |
| 2,342,770 | A | * | 2/1944 | Temple | 137/636.1 |
| 2,479,763 | A | * | 8/1949 | Morris | 280/301 |
| 2,496,593 | A | * | 2/1950 | Morgan | 280/301 |
| 3,774,470 | A | * | 11/1973 | Cottin | 74/527 |
| 4,241,933 | A | * | 12/1980 | Gratza et al. | 280/301 |
| 4,807,489 | A | * | 2/1989 | Schreiner et al. | 74/473.28 |
| 5,211,073 | A | * | 5/1993 | Nikl et al. | 74/527 |
| 5,309,787 | A | * | 5/1994 | Soyka et al. | 74/527 |
| 5,979,269 | A | * | 11/1999 | Su-Chen | 74/564 |

FOREIGN PATENT DOCUMENTS

| CH | 250244 | * | 8/1947 | 280/301 |
| EP | 0239869 | * | 3/1987 | |
| FR | 30688 | * | 8/1926 | 280/301 |
| FR | 2110744 | * | 6/1972 | 280/301 |
| JP | 52263/1977 | | 10/1975 | |
| JP | 88892/1991 | | 9/1991 | |
| NL | 80394 | * | 8/1955 | 280/301 |

* cited by examiner

Primary Examiner—Anne Marie Boehler
(74) Attorney, Agent, or Firm—Birch, Stewart, Kolasch & Birch, LLP

(57) ABSTRACT

A spring stand for motorcycles for making a return spring invisible from the outside to provide a neat appearance. A side stand is installed on a side lower section of a motorcycle body through a stand bracket. The side stand is formed on a pipe-shape in which a return spring and an engaging member which is biased in the projecting direction by the return spring are provided. A roller provided at the top section of the engaging member is caused to mount a mounting section provided on a stand bracket and to selectively engage a second engaging recession or a stand switch.

12 Claims, 8 Drawing Sheets

SIDE STAND DEVICE FOR MOTORBIKE

This application is the national phase under 35 U.S.C. §371 of PCT International Application No. PCT/JP01/10126 which has an International filing date of Nov. 20, 2001, which designated the United States of America.

BACKGROUND OF THE INVENTION

1. Field of the Invention

The present invention relates to a side stand device for motorcycles, and more particularly to a side stand which can make the external appearance neat.

2. Description of the Prior Art

A side stand device for motorcycles has been constructed in which an upper section of a side stand is rotatably installed on a stand bracket provided on a lower side section of a motorcycle body by a rotational center shaft and a return spring is provided between the side stand and the stand bracket, wherein the side stand is biased so as to rotate to either a use position or a housing position by the action of this return spring (See Japanese Unexamined Patent Publication No. HEI 11-208546 as one example).

In the conventional side stand, the return spring is comparatively large and easily visible from the outside. It is therefore necessary to improve the external appearance so that a neat outer appearance can be obtained.

SUMMARY OF THE INVENTION

It is therefore an object of the present invention to realize such a requirement.

To solve the above problem, according to a first invention regarding a side stand device for motorcycles of the present application, the side stand device for motorcycles having a side stand rotatably installed on a lower side section of a motorcycle body in which the side stand is biased so as to rotate to either a housing position or a use position by a return spring is provided, characterized in that a cam section is provided on a side of the motorcycle body near a rotational center shaft and the cam section is provided with a mounting section and first and second engaging recessions, each having a small center distance, on each side of the mounting section, and that an engaging member is provided on the side of a side stand to selectively engage either the first or second engaging recessions when the side stand is in the use position or in the housing position and to slide on the mounting section when the side stand is in an intermediate position, wherein the engaging member is biased so as to be pushed toward the cam section by the return spring.

According to a second invention, a side stand device for motorcycles having a side stand rotatably installed on a lower side section of a motorcycle body in which the side stand is biased to rotate to either a housing position or a use position by a return spring is provided, characterized in that the return spring is housed within the side stand so as to not make the return spring easily visible from the outside.

According to the first invention, a cam section is provided on the side of the motorcycle body near the rotational center shaft of the side stand. The cam section is provided with the mounting section, and first and second engaging recessions, each having a small center distance, on each side of the mounting section, wherein the engaging member provided on the side of the side stand is biased so as to be pushed toward the cam section by the return spring. In this manner, the engaging member is constructed to selectively engage either the first or second engaging recession when the side stand is in the use position or in the housing position and to slide on the mounting section when the side stand is in the intermediate position.

Accordingly, as the return spring does not sway laterally even though the side stand is caused to rotate, the return spring can be arranged along the side stand so that it is not easily visible from the outside. Thus, the side stand can be provided in a neat condition to improve the external appearance.

According to the second invention, the return spring is housed within the side stand so that it is not easily visible from the outside. Accordingly, the side stand can be provided in a neat condition to improve the external appearance.

DETAILED DESCRIPTION OF THE PREFERRED EMBODIMENTS

Figure 1:
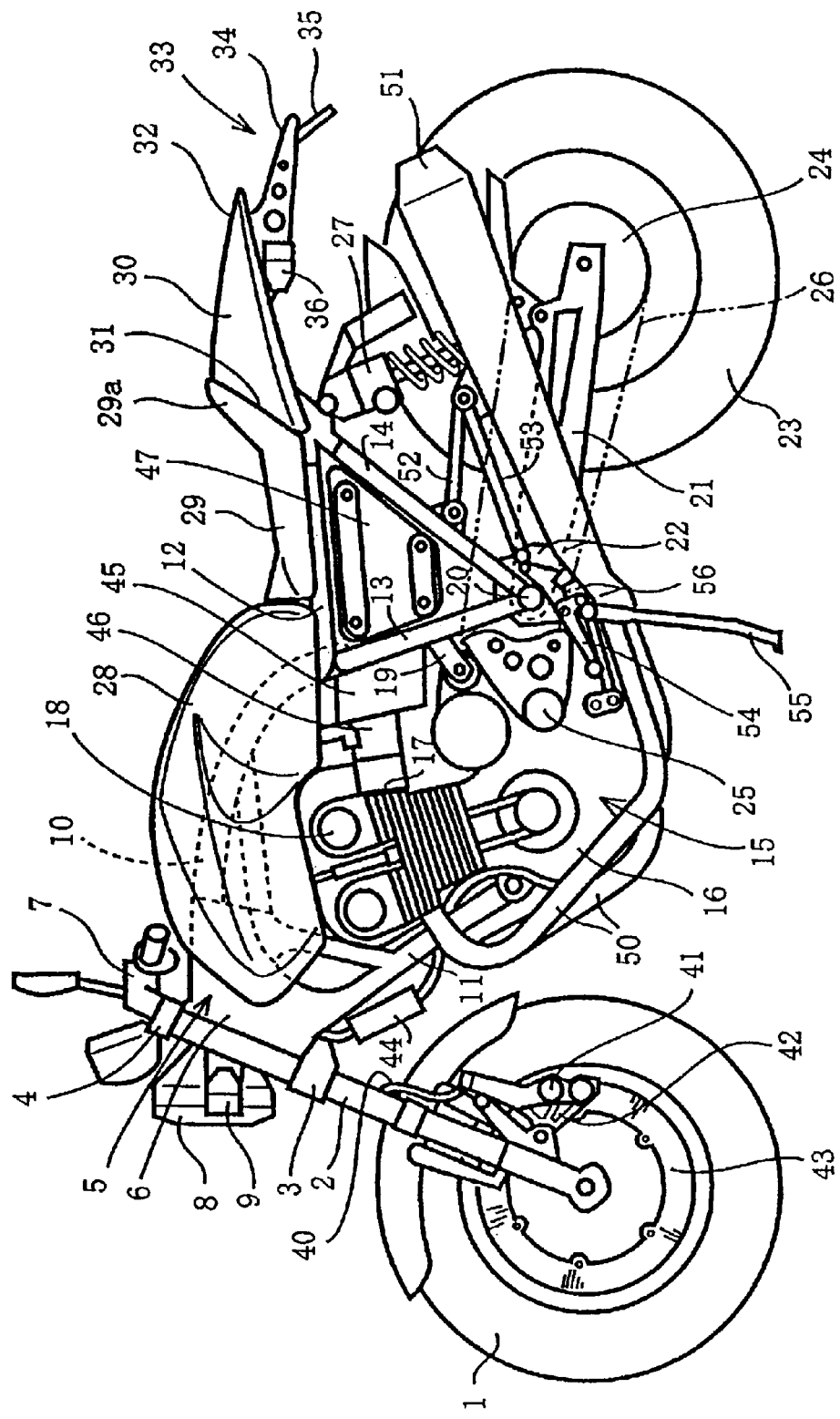
FIG. 1 is a left side view of an entire motorcycle according to the present invention.
Figure 2:
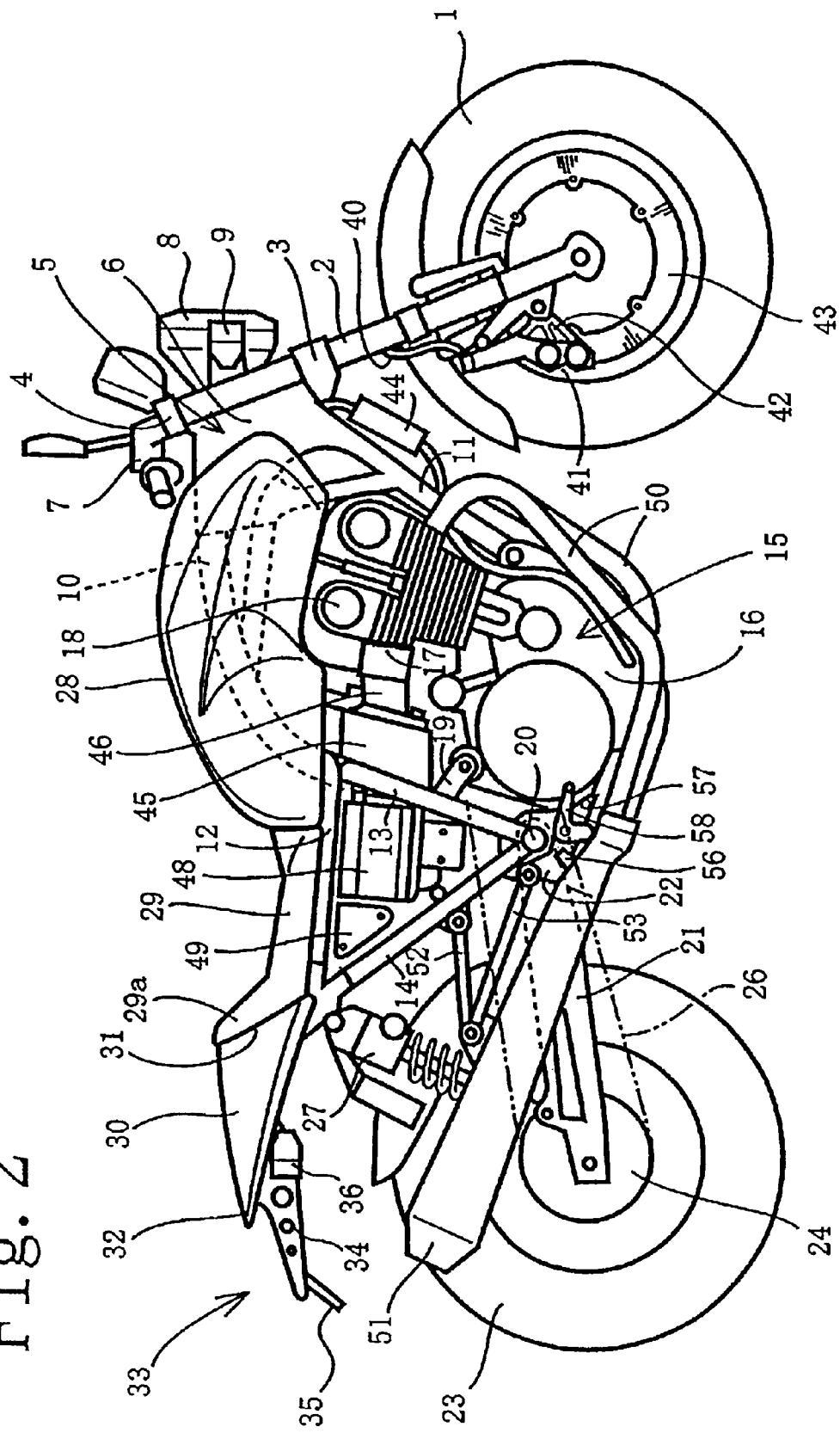
FIG. 2 is a right side view of the above.

One embodiment of the present invention will now be described with reference to the accompanying drawings. First, an entire mechanism of a motorcycle according to the present invention is outlined. FIG. 1 is a left side view of this motorcycle and FIG. 2 is a right side view of the same. As apparent from these figures, a front fork 2 supporting a front wheel 1 is supported at its upper section by a front section 6 of a motorcycle body frame 5 through a bottom bridge 3 and a top bridge 4 and is caused to rotate by a handle 7. A headlamp 8 is installed on a front section of the body frame 5 and front blinkers 9 are provided on the right and left sides of the headlamp 8.

The body frame 5 comprises the front section 6 formed by forging or the like, one main frame 10 extending backward and substantially level along the center of the body, one down frame 11 extending backward and slanting downward from the front section 6, a pair of right and left seat rails 12 extending backward and substantially level from a rear section of the main frame 10, a pair of right and left center frames 13 extending backward and slanting downward from the rear section of the main frame 10, and a pair of right and left rear frames 14 slantingly connecting the lower ends of the center frames 13 to the rear ends of the seat rails 12 to form a substantially V-shaped space from the side view between the center frames 13 and the rear frames 14. Each frame member is a pipe made of a suitable metal such as iron or an aluminum alloy and, in the present embodiment, round pipe is used.

The lower section of the down frame 11 is connected to a front section of a crankcase 16 in an air-cooled (or oil-cooled) in-line four cylinder type four cycle engine 15. The back upper section of the crankcase 16 is connected to the center frames 13 by engine hangers 19 extending forward and slanting downward from intermediate sections of the center frames 13. In this manner, the body frame 5 is formed as a diamond frame including the engine 15 as a part of the components.

Each lower end section of the center frames 13 and the rear frames 14 is interconnected at boss-shaped pivot sections 20, and front ends of rear swing arms 21 are rotatably pivoted at a pivot (not shown) by the right and left pivot sections 20. The rear lower section of the crankcase 16 is supported at a hanger and bracket 22, described below, supported at the pivot.

A rear wheel 23 is rotatably supported at the rear ends of the rear swing arms 21 and driven by a chain 26 installed between a driven sprocket 24 and a drive sprocket (not shown) housed within a sprocket cover 25 which is provided at the rear section of the crankcase 16. Rear cushion units 27 are provided between the rear sections of the rear swing arms 21 and the rear sections of the seat rails 12 to form a rear wheel suspension.

A fuel tank 28 is supported on the main frame 10, and a seat 29 arranged adjacent to the rear section of the fuel tank 28 is supported on the seat rails 12. The rear end of the seat 29 forms a backrest section 29a which projects slanting upward. The seat 29 is shown here as a single seat, but it can be optionally changed to a double seat.

A tail cowl 30 with a substantially triangular shape from a side view is provided adjacent to the rear surface of the backrest 29a. The tail cowl 30 is a member made of a suitable material such as resin of which a front slant face 31 contacting the backrest 29a has a vertically widest side. The tail cowl 30 extends backward to have a tapered shape, and the rear end 32 thereof is formed to make an acute angle.

A tail unit 33 is installed near the rear end 32. The tail unit 33 is provided with a license plate 35 on each rear end of a pair of right and left sheet metal-shaped frames 34 and with right and left rear blinkers 36 on the sides of the sheet metal-shaped frames 34. A license lamp and the like which are not shown in the figure are also integrally formed with the tail unit 33.

Reference numeral 40 in the figure is a pair of front brake hoses which are connected between a master cylinder (not shown) of a handle lever and a pair of brake calipers 41 of dual brakes provided on the right and left sides of the front wheel 1. The brake calipers 41 are supported on lower sections of the front forks 2 through caliper brackets 42 to slidably contact a pair of right and left brake discs 43.

Numeral 44 is an oil cooler and 45 is an air cleaner. The air cleaner 45 is connected to an intake port in a cylinder head 17 of the engine 15 through an electronic injection unit 46 to supply a fuel-air mixture to the cylinder head 17 from the electronic injection unit 46. Numeral 47 is a cover for an air cleaner casing which is disposed within a substantially triangular space surrounded by the seat rails 12, the center frames 13 and the rear frames 14. As shown in FIG. 2, housed within the substantially triangular space provided on the right side of the motorcycle body are a battery 48 and a fuse box 49.

Exhaust gas is led from an exhaust port of the cylinder head 17 through an exhaust pipe 50 to a muffler 51 provided at a rear section of the body. The exhaust pipe 50 is provided to respectively arrange two pipes on each side of the body, wherein each unit of two pipes is connected to a pair of mufflers 51 provided on the right and left sides of the body.

Numerals 52 and 53 are pipe-shaped stays for supporting the muffler 51. The upper stay 52 extends backward from the intermediate section of the rear frame 14 and the lower stay 53 extends backward from the rear end section of the hanger and bracket 22 to form a substantially triangular shape from a side view.

Rotatably supported on the hanger and bracket 22 provided on the left side of the motorcycle body shown in FIG. 1 are a change pedal 54 on the front side and a side stand 55 on the central side, wherein a step 56 is installed at the back of the side stand 55. As apparent in FIG. 2, the front lower section of the hanger and bracket 22 projects forward to form an engine hanger 57 which supports the lower section of the crankcase 16.

The hanger and bracket 22 on the right side of the motorcycle body shown in FIG. 2 has the same mechanism as that on the left side of the body, but here a brake pedal 58 is provided in place of the change pedal 54.

Figure 3:
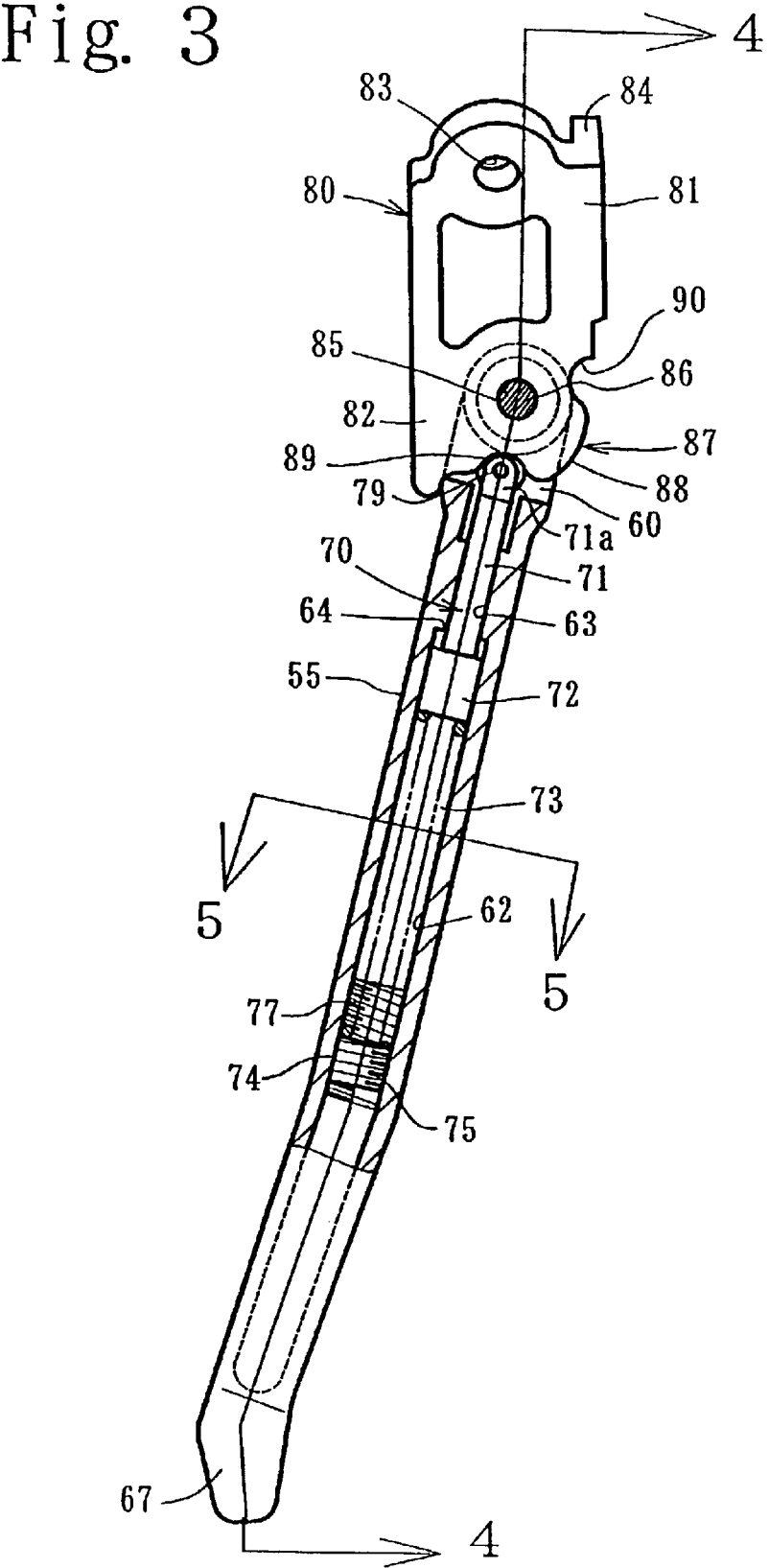
FIG. 3 is a cross-sectional view of a side stand according to one embodiment.
Figure 4:
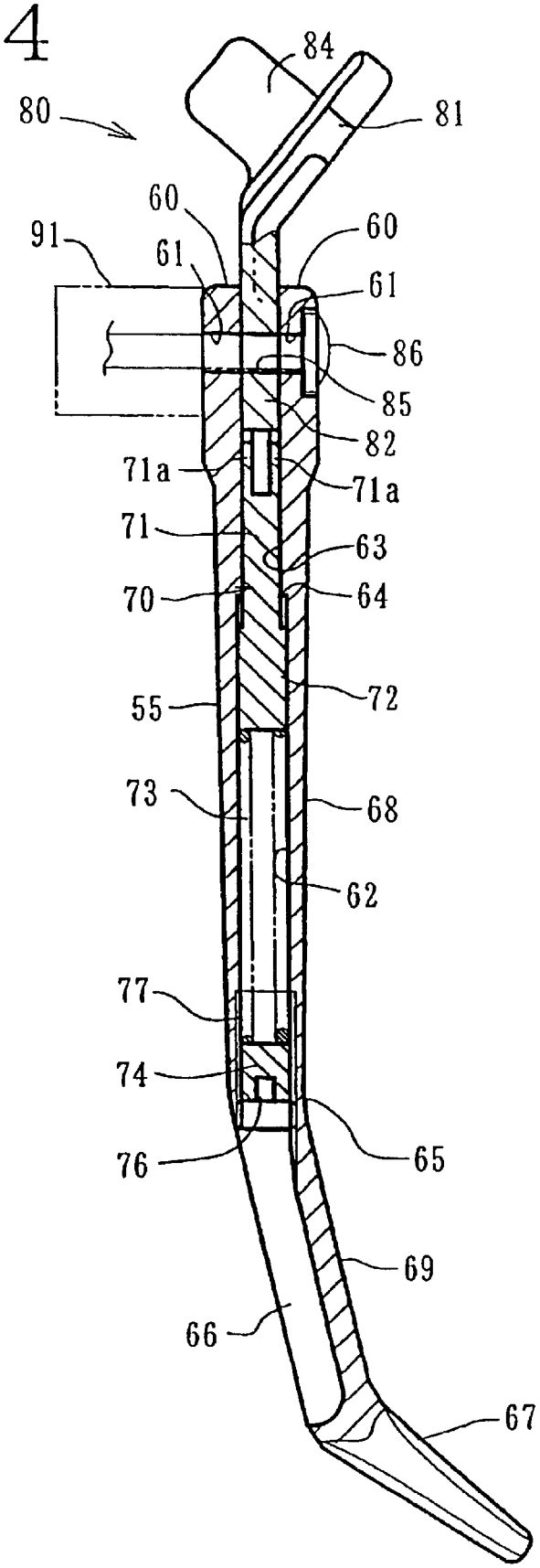
FIG. 4 is a cross-sectional view taken along line 4—4 of FIG. 3.
Figure 5:
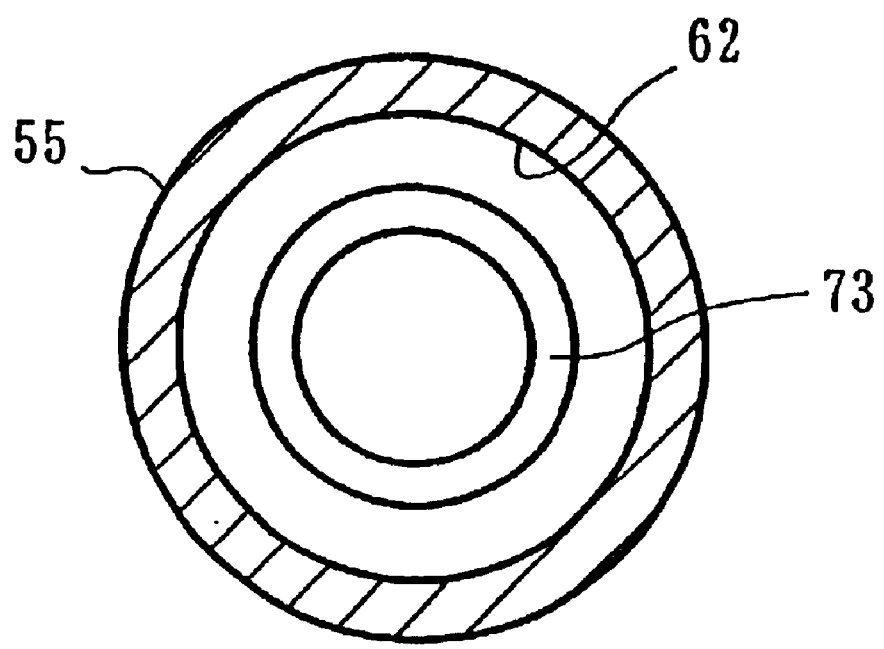
FIG. 5 is cross-sectional view taken along line 5—5 of FIG. 3.
Figure 6:
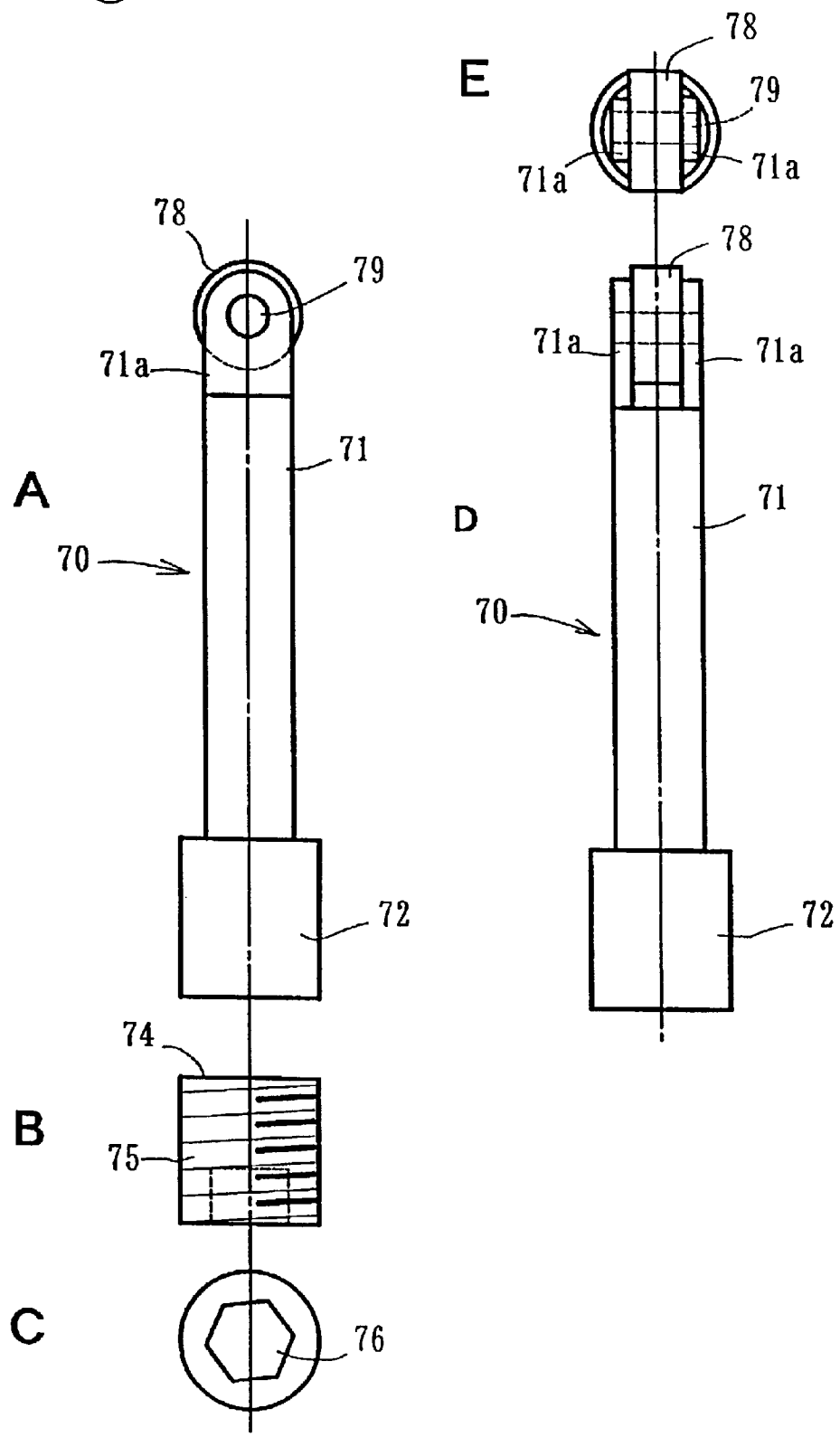
FIG. 6 is a view explaining built-in parts.
Figure 7:
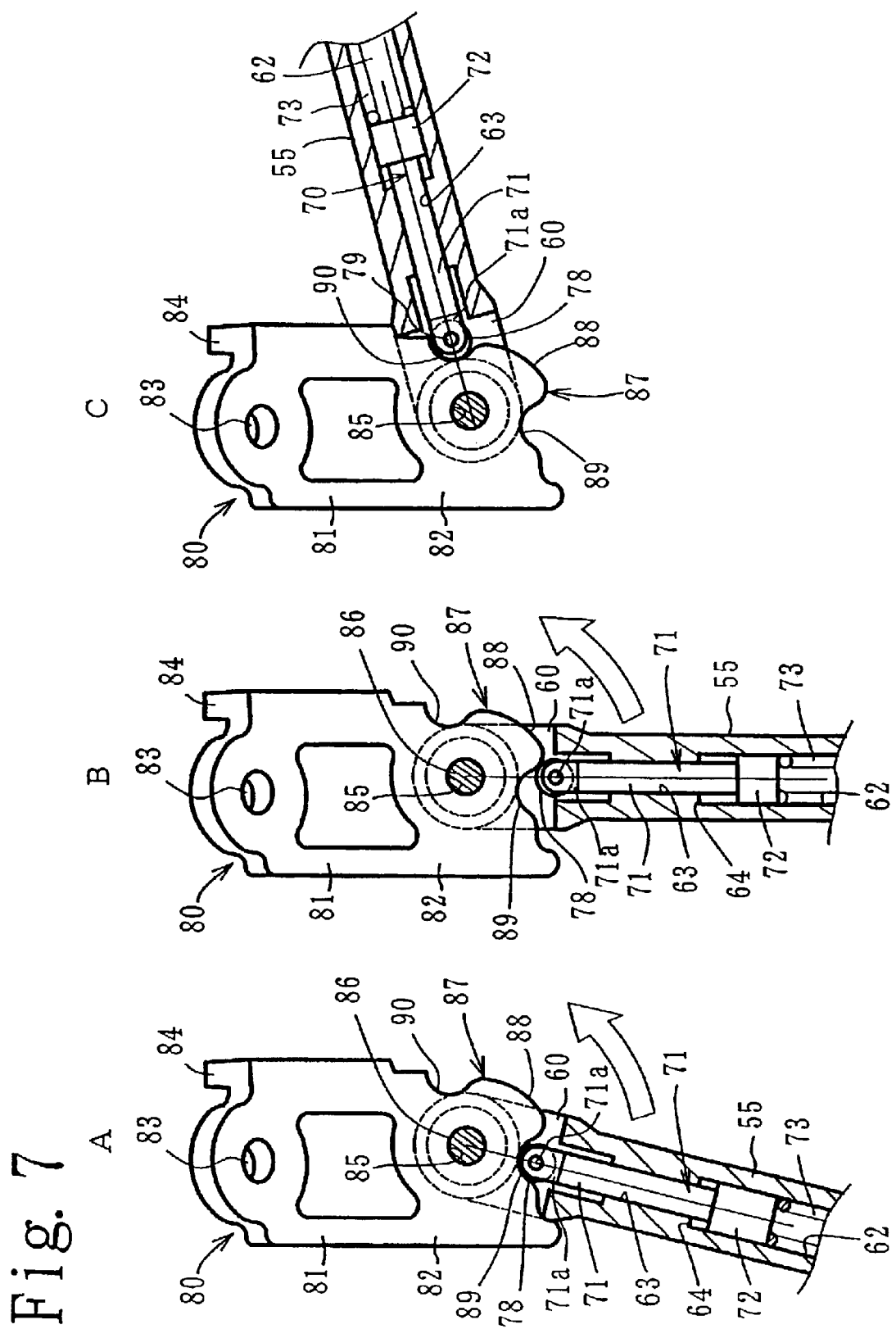
FIG. 7 is a view explaining operation.

A side stand will now be explained. FIG. 3 is a side view showing the side stand partially cut away and FIG. 4 is a cross sectional view of the side stand taken along line 4—4 of FIG. 3. FIG. 5 is a cross sectional view of the same taken along line 5—5 of FIG. 3, and FIG. 6 is a view showing components on the side of the side stand. FIG. 7 is a view showing operation of the side stand.

Referring first to FIGS. 3 to 5, the side stand 55 is a member with a substantially tubular shape as a whole which is made of a suitable metal such as iron (see FIG. 5). The upper end section of the side stand 55 is formed with forked sections 60 each extending in a flat plate-shape in parallel, and an installation hole 61 is formed in each of the forked sections 60, with the holes 61 opposing one another.

An axial hole 62 formed in the axial direction is provided with a small diameter section 63 at its upper side so that the side stand 55 has a thick section to provide a step 64 between the axial hole 62 and the thick section.

The side stand 55 is provided with a bent section 65 below the upper section 68 in which the small diameter section 63 opens upwards. The lower section 69 below the bent section 65a forms an inward-opening recession 66, and a lower end of the side stand 55 is further bent to form a ground contact section 67 with a flat shape (see FIG. 4).

A small diameter section 71 of an engaging member 70 sidably passes through the small diameter section 63, and the projecting section of the small diameter section 71 extends up to the vicinity of the installation hole 61. The other end of the engaging member 70 is provided with a large diameter section 72 moving within the axial hole 62. The other end of the engaging member 70 is prevented from slipping out by the step 64.

One end of the large diameter section 72 contacts one end of a return spring 73 housed within the axial hole 62, and the large diameter section 72 is biased in the direction to be pressed against the step 64 by the return spring 73, wherein the small diameter section 71 is biased upward in the figure to project to the side of the forked sections 60. The other end of the return spring 73 contacts an adjuster 74 inserted through the open end of the small diameter section 63 near the bent section 65.

As shown in FIG. 6, the outer circumference of the adjuster 74 is provided with a male screw 75 which engages a female screw 77 formed on the inner circumference of the side stand 55 near the bent section 65. One end surface of the adjuster 74 in the axial direction is formed with a hexagonal recession 76. By inserting a tool into the hexagonal recession and rotating the tool, the position of the adjuster 74 can be changed to adjust the elasticity of the return spring 73. In this case, as the recession 66 is bent from the bent section 65, operation of the tool on the adjuster 74 becomes easy.

Referring to FIG. 6, A shows the engaging member 70, B shows the adjuster 74, and C shows the end surface where the hexagonal recession 76 of the adjuster 74 is formed. D shows the engaging member 70 in a 90° different condition from A and E shows the condition of the engaging member 70 seen from the top of D. As apparent from these figures, the projection end 71a of the small diameter section 71 is formed in a flat plate shape to provide forked sections extending in parallel to each other. A roller 78 is rotatably supported around a pivot 79 between the projections 71a.

Referring again to FIGS. 3 and 4, the side stand 55 is rotatably installed on a stand bracket 80. The stand bracket 80 is a member obtained by pressing or forging a metal and is provided with a main body section 81 which is installed on the side of the motorcycle body, and with a slope section 82 which extends to the lower section of the main body section 81 and which is bent to project outwards and obliquely. The main body section 81 is installed on a pivot section bracket 22 on the motorcycle body side through an installation hole 83 and its rotation is stopped by a bent section 84 bent substantially at a right angle.

The central section of the slope section 82 is provided with an installation hole 85. The slope section 82 is inserted between the forked sections 60 of the side stand 55 to allow the installation hole 61 to meet with the installation hole 85. In this manner, the slope section 82 and the forked section 60 are integrally connected by a rotating center shaft 86, wherein the side stand 55 is rotatably connected relative to the stand bracket 80.

The end surface of the slope section 82 entering the forked sections 60 is provided with a cam section 87 which consists of a mounting section 88 and a first engaging recession 89 and a second engaging recession 90 formed on either side of the mounting section 88. The center distance of the first engaging recession 89 and the second engaging recession 90 from each rotating center shaft 86 is smaller than that of the mounting section 88 from the rotating center shaft 86. Further, the center distance of the mounting section 88 changes to be gradually smaller from the first engaging recession 89 toward the second engaging recession 90.

When the side stand 55 is in the use position, the roller 78 of the engaging member 70, which projects on being pressed by the return spring 73, engages the first engaging recession 89. When the side stand 55 is in the housing position, the roller 78 engages the second engaging recession 90. On the other hand, when the side stand 55 rotates in the intermediate position between the use position and the housing position, the roller 78 is adapted to mount the mounting section 88 for rolling movement. In this case, the return spring 73 is compressed by the engaging member 70 which was pressed down.

Numeral 91 in FIG. 4 is a stand switch which is constructed, for example, as a rotary switch supported by the same shaft as the rotating center shaft 86 and integrally installed on the forked sections 60 which are situated inside of the body. The rotary switch is a conventional switch for detecting the rotational position of the side stand 55.

Operation of the present embodiment will now be explained. FIG. 7A shows the use position, FIG. 7B shows the intermediate position, and FIG. 7C shows the housing position. Referring first to A, the side stand 55 is in the use position in which the engaging member 70 is pressed out by the return spring 73 to allow the roller 78 to engage the first engaging recession 89. To shift the side stand 55 to the housing position from this condition, the side stand 55 is kicked up and the return spring 73 is compressed through the engaging member 70 to allow the roller 78 to mount the mounting section 88.

In this position, a shaft line of the engaging member 70 meets an end section on the side of the first engaging recession 89, and the mounting section 88 changes to gradually reduce the center distance toward the second engaging recession 90. As a result, the roller 78 mounts the mounting section 88 by momentum and the force from the return spring 73 to enter the second engaging recession 90, wherein the roller 78 again engages the second engaging recession 90 and stops its motion.

It is also possible to change from C to A easily and surely by reverse operation. In this case, as the return spring 73 is used as a compression spring, it is possible to surely rotate the side stand 55 to effect A or C. Further, provision of the roller 78 makes the rotation smooth.

As the return spring 73 does not be provided beyond the rotating center shaft 86 as in the prior art, even though the side stand 55 is caused to rotate between the use position and the housing position, the return spring 73 does not sway laterally. Accordingly, as the return spring 73 can be housed within the side stand 55 with a comparatively slim pipe shape and it is not exposed to the outside, it is possible to make the external appearance neat.

Further, provision of the adjuster 74 can make elastic adjustment of the return spring 73 simple, and rotation of the side stand 55 can always be maintained in the optimum condition. It is also possible to make adjustment operation of the adjuster 74 easier by making use of the bent section 65 of the side stand 55. The stand switch 91 can also be arranged on the inside of the body. In the prior art, it was not possible to make such arrangement due to interference with the return spring.

Figure 8:
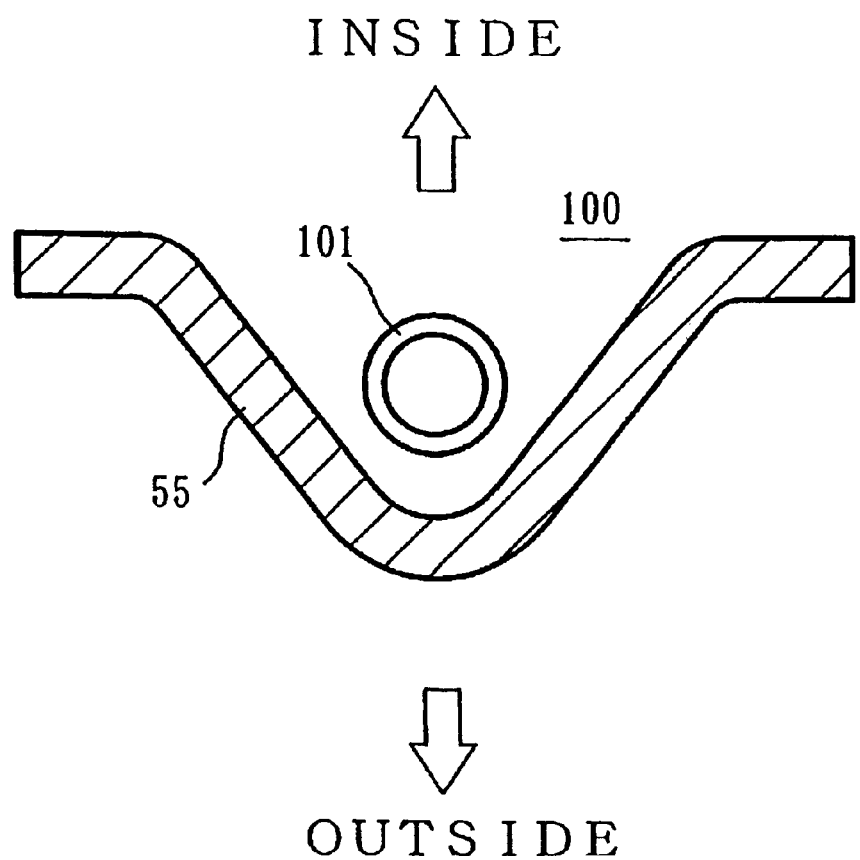
FIG. 8 is a transverse sectional view of a side stand according to another embodiment.

FIG. 8 is another embodiment showing the cross section of the side stand 55 as in FIG. 5. In this embodiment, the side stand 55 is formed with a substantially V-shaped cross section in which a recessed space 100 opening to the inside of the body is provided and a return spring 101 is provided within the space 100.

This return spring 101 may be constructed as a push spring the same as the return spring 73 in the previous embodiment or may be a coil spring which is used as the return spring as seen in the prior art. In the latter case, if in the breadth of the recessed space 100 the side stand 55 is expanded, this makes lateral sway of the return spring 101 possible.

Even in such a case, the return spring 101 is completely housed within the recessed space 100 of the side stand 55. In other words, as the return spring 101 is housed within the side stand 55, it is possible to not make the return spring easily visible from the outside and to make the external appearance neat.

It is to be noted that the present invention is not limited to each embodiment described above, but may be varied or applied in many ways. For example, the engaging mechanism of the push spring and the engaging member 70 with the cam section 87 in the first embodiment are not always housed within the side stand 55, but may be exposed to the outside as in the prior art. Even in such a case, if these mechanisms are arranged along the side of the side stand 55 in the inside of the body, as these are basically mechanisms which do not sway laterally, it is possible to not make the mechanisms easily visible from the outside and as a result, a neat external appearance can be realized.

What is claimed is:

1. A side stand device for motorcycles, comprising:

a side stand installed on a lower side section of a motorcycle body, the side stand having an arm member which is rotatably biased so as to rotate to either a housing position or a use position by a return spring;

a cam section provided on the lower side section of the motorcycle body near a rotational center shaft, the cam section being provided with a mounting section and first and second engaging recessions, each having a small center distance, on each side of the mounting section;

an engaging member provided coaxially to the arm member to selectively engage either of the first engaging recession or the second engaging recession when the arm member is in the use position or in the housing position, and to slide on the mounting section when the arm member is in an intermediate position, the engaging member having a small outer diameter section on an upper end and a large outer diameter section on a lower end; and a roller attached to the upper end of the engaging member for rolling against the cam section, the roller having a diameter larger than a width of the small diameter section of the engaging member, wherein the engaging member is biased so as to be pushed toward the cam section by the return spring, an upward movement of the engaging member being limited by contact of the large outer diameter section of the engaging member against a step of the arm member.

2. The side stand device for motorcycles according to claim 1, wherein the arm member of the side stand is provided with an axial hole and inward-opening recession, and the engaging member is inserted into the axial hole through the inward-opening recession.

3. The side stand device for motorcycles according to claim 2, wherein the return spring is disposed in the axial hole under the engaging member.

4. The side stand device for motorcycles according to claim 1, wherein the return spring is a coil spring.

5. A side stand device for motorcycles, comprising:

a side stand installed on a lower side section of a motorcycle body, the side stand having an arm member which is rotatably biased so as to rotate to either a housing position or a use position by a return spring, the return spring being housed coaxially with the arm member of the side stand in a position below an engaging member, whereby the return spring is not easily visible from the outside;

an adjuster member disposed below the return spring and capable of being moved up and down along a portion of a length of the arm member of the side stand for making an elastic adjustment to the return spring;

wherein the arm member includes an upper section with an axial hole, and a lower section joining the upper section at a bent section, the lower section being angled with respect to the upper section and having an inward-opening recession opened to a back side of the arm member, wherein a lower end of the axial hole is exposed to the inward-opening recession in order to insert the engaging member into the axial hole through the inward-opening recession.

6. The side stand device for motorcycles according to claim 5, wherein the adjuster member is inserted into the axial hole through the inward-opening recession.

7. The side stand device for motorcycles according to claim 6, wherein the return spring is disposed in the axial hole under the engaging member.

8. The side stand device for motorcycles according to claim 5, wherein the return spring is a coil spring.

9. The side stand device for motorcycles according to claim 5, wherein the adjuster member is proved with a male screw which engages with a female screw formed on an inner circumference of the side stand.

10. The side stand device for motorcycles according to claim 5, wherein the engaging member includes a small outer diameter section on an upper end and a large outer diameter section on a lower end; and a roller attached to the upper end of the engaging member for rolling against the cam section, the roller having a diameter larger than a width of the small diameter section of the engaging member.

11. A side stand device for motorcycles, comprising:

a side stand installed on a lower side section of a motorcycle body, the side stand having an arm member which is rotatably biased so as to rotate to either a housing position or a use position by a return spring;

a cam section provided on the lower side section of the motorcycle body near a rotational center shaft, the cam section being provided with a mounting section and first and second engaging recessions, each having a small center distance, on each side of the mounting section;

an engaging member provided coaxially to the arm member of the side stand to selectively engage either of the first engaging recession or the second engaging recession when the arm member of the side stand is in the use position or in the housing position, and to slide on the mounting section when the arm member of the side stand is in an intermediate positions;

wherein the engaging member is biased so as to be pushed toward the cam section by the return spring, wherein the arm member includes an upper section, a lower section, and a ground supporting section, the lower section being angled with respect to the upper section at one angle, and the ground supporting section being angled with respect to the lower section at another angle; and further comprising an adjuster member disposed in the upper section of the arm member, adjacent to the one angle where the upper section joins the lower section.

12. The side stand device for motorcycles according to claim 11, wherein the arm member of the side stand is formed with a substantially V-shaped cross section in which a recessed space opening is provided and the return spring is provided within the recessed space.

* * * * *